United States Patent [19]

Stevens et al.

[11] Patent Number: 5,567,946

[45] Date of Patent: Oct. 22, 1996

[54] DECONNABLE SELF-READING POCKET DOSIMETER CONTAINMENT WITH SELF-CONTAINED LIGHT

[75] Inventors: Robyn L. Stevens; Greg N. Arnold, both of Idaho Falls; Ryan G. McBride, Rexburg, all of Id.

[73] Assignee: The United States of America as represented by the United States Department of Energy, Washington, D.C.

[21] Appl. No.: 433,302

[22] Filed: May 3, 1995

[51] Int. Cl.$^6$ .................................................. G01T 1/14
[52] U.S. Cl. ........................................... 250/376; 362/189
[58] Field of Search ..................................... 250/376, 377, 250/378, 390.03, 370.07; 362/189

[56] References Cited

U.S. PATENT DOCUMENTS

| | | | |
|---|---|---|---|
| 2,465,886 | 3/1949 | Landsverk et al. | 250/376 |
| 2,733,356 | 1/1956 | Ragosine et al. | 250/376 |
| 3,459,940 | 8/1969 | Bryer | 250/376 |
| 4,224,522 | 9/1980 | Jackson et al. | 250/377 |
| 4,774,643 | 9/1988 | McGinnis et al. | 362/189 |

Primary Examiner—Carolyn E. Fields
Assistant Examiner—Edward J. Glick
Attorney, Agent, or Firm—Virginia B. Caress; William R. Moser; Paul A. Gottlieb

[57] ABSTRACT

A container for a self-reading pocket dosimeter includes a transparent tube for receiving the self-reading pocket dosimeter, a light source mounted at one end of the transparent tube, and an eyepiece mounted on an opposite end of the transparent tube for viewing a read-out of the self-reading pocket dosimeter. The container may further include an activation device for selectively supplying power to the light source. The container both protects the dosimeter from being contaminated and provides a light source for viewing the dosimeter.

16 Claims, 1 Drawing Sheet

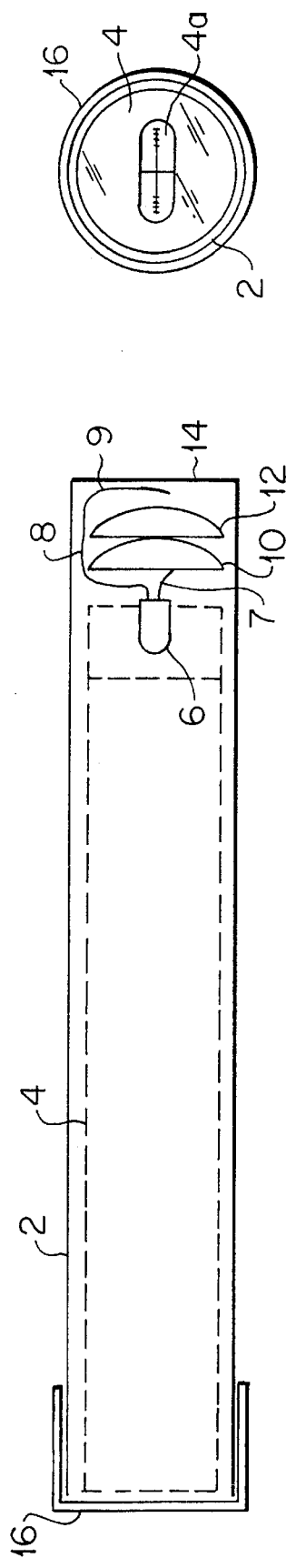
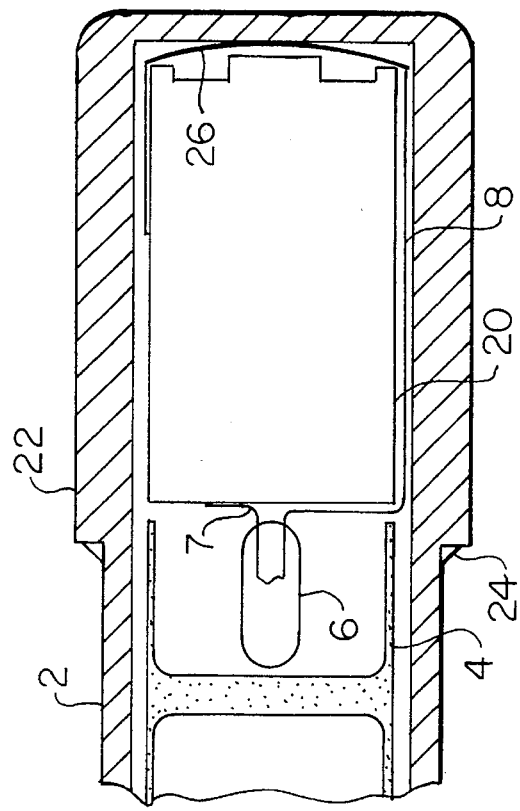
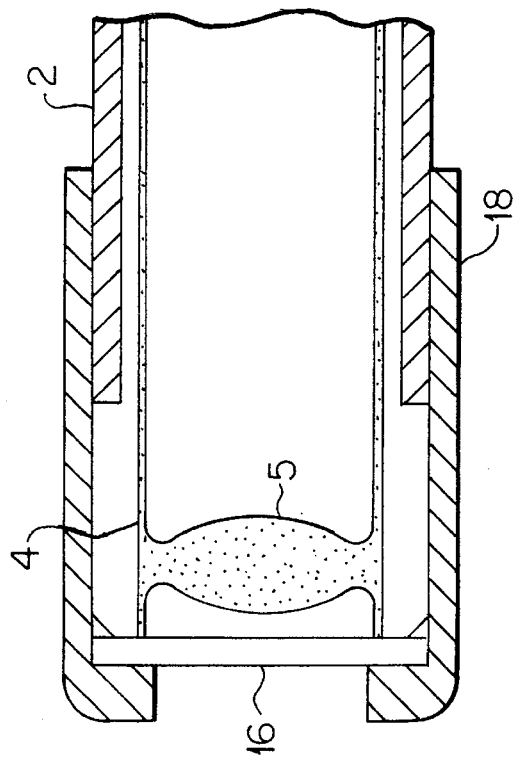

DECONNABLE SELF-READING POCKET DOSIMETER CONTAINMENT WITH SELF-CONTAINED LIGHT

BACKGROUND OF THE INVENTION

1. Field of the Invention

This invention generally relates to a deconnable or decontaminatable self-reading pocket dosimeter (SRPD) container having a self-contained light.

2. Description of the Related Art

An SRPD is a device used to monitor radiation exposure during entry into high radiation areas. The SRPD helps personnel not to exceed a predetermined radiation, in particular gamma radiation, exposure. The SRPD is a small cylinder tube which is placed to the eye and then towards a light source to read a hair-line fiber on a scale. The scale is indicative of the exposure received.

Previously, the SRPD has been contained in a small plastic bag to prevent contaminating, and thus avoid having to discard, the SRPD. However, the plastic bag distorts the scale and the fiber, making it difficult to read. Also, the environment in which the SRPD is desired to be used is often poorly lit. For example, if the lighting is in the ceiling, an individual must tilt his or her head back and direct the SRPD to the light, making it possible to contaminate his or her face.

SUMMARY OF THE INVENTION

It is an object of the present invention to overcome the problems discussed above as well as other difficulties. According to the invention, a container is provided for a self-reading pocket dosimeter including a transparent tube for receiving the self-reading pocket dosimeter, a light source mounted at one end of the transparent tube, and an eyepiece mounted on an opposite end opposite the transparent tube for viewing a read-out of the self-reading pocket dosimeter.

In accordance with a further aspect of the invention, an activation device is provided for selectively supplying power to the light source. The activation device preferably includes a battery, a contact switch located behind, but not in contact with, the battery, a lead connected to the light source and the contact switch, and a flexible cap located behind the battery and the contact switch for pressing the contact switch into contact with the battery when the flexible cap is depressed. Alternatively, the activation device advantageously includes a battery located behind the light source, a stationary cap closing off the end of the tube closest to the light source, and a pressure sensitive switch located between the battery and the stationary cap for connecting the battery to the light source when pressure is received by the stationary cap.

According to a further feature of the invention to provide a mechanism is provided for closing off the end of the tube nearest the eyepiece while allowing viewing through the eyepiece. In one advantageous embodiment, such a mechanism includes a slidable cap closing having the eyepiece housed in an opening in the slidable cap. In an alternative advantageous embodiment, the eyepiece is integral with a transparent cap.

Other objects, features and advantages of the invention will be set forth in, or apparent from, the detailed description of the preferred embodiments of the invention which follows.

BRIEF DESCRIPTION OF THE DRAWINGS

FIG. 1 is a side view of an assembly of an SRPD and a SRPD container with a self-contained light source in accordance with one preferred embodiment of the present invention;

FIG. 2 is an end view of the assembly of FIG. 1;

FIG. 3 is aside view of an alternative viewing arrangement in the SRPD container in accordance with a further embodiment of the present invention; and FIG. 4 is a side view of an alternative light source activation arrangement in the SRPD container in accordance with another preferred embodiment of the present invention.

DETAILED DESCRIPTION OF THE PREFERRED EMBODIMENTS

Referring to FIGS. 1 and 2, an assembly as shown wherein a transparent tube 2 surrounds both an SRPD 4 with a display indicated at 4a (FIG. 2) and a light source 6. One end of the tube 2 has a flexible sealed cap 14 used to activate the light source 6. The other end of the tube 2 has a tightly closed removable cap 16 which is transparent to serve as an eyepiece and allow reading of the enclosed SRPD 4. The light source 6 is powered by two batteries 10, 12 connected in series with heat shrinkable tubing. One lead 7 from the light source 6 is soldered to the pole of the batteries 10, 12. Another lead 8 is soldered to a lead contact switch 9 which allows a user to activate the light source 6 by applying finger pressure to the flexible sealed end 14 of the tube 2.

Preferably, the tube 2 is constructed of a rigid, non-porous material such as PLEXIGLAS®, an acrylic resin plastic, LEXAN®, a polycarbonate resin plastic, or other polycarbonate materials. TYGON®, a vinyl plastic, may also be used for a more resilient tube. The tube 2 advantageously has an internal diameter of 9/16th of an inch and a length of about 5 inches. The light source 6 preferably consists of a green/amber light emitting diode (LED). In the specific exemplary embodiment under consideration, mounting the light source 6 inside the tube 2 requires that the height of the shoulder (battery to the top of the bulb 6 be less than or equal to 5/16th of an inch because a larger dimension will cause the SRPD 4 to reset thereby destroying the data. Batteries 10, 12 are advantageously camera batteries. An example of an acceptable SRPD is an IM-9K/PD.

FIG. 3 illustrates an alternative embodiment of the clear eyepiece 16 to that shown in FIG. 1. In this embodiment, the clear eyepiece 16 is attached to a sliding cap 18 which allows for easy removal of the SRPD 4. The tube 2 does not fully surround the SRPD 4. A lens 5 of the SRPD 4 is also shown.

FIG. 4 shows an alternative embodiment to the light activation means shown in FIG. 1. The flexible sealed cap 14 has been replaced by the stationary cap 22 surrounded by sealant 24. The lead contact switch 9 for triggering the light source 6 is now provided by the pressure sensitive switch 26 which is activated by thumb pressure against the stationary cap 22. Also in this embodiment, a battery 20 is shown in a single battery configuration and the light source 6 is shown as a light bulb.

The device of the present invention allows an individual to always be able to read the SRPD regardless of lighting conditions or placement. The containment provided by the present invention also guarantees that the SRPD will never become contaminated internally or externally. The container is reusable and can be decontaminated for reuse. If decontamination is unsuccessful, the only part that would need to be discarded is the containment case, which is much less expensive than the SRPD. The containment provided by the present invention also eliminates the possibility of contaminating the user due to holding the SRPD above the user's face while being viewed.

Although the present invention has been described relative to specific exemplary embodiments thereof, it will be understood by those skilled in the art that variations and modifications can be effected in the exemplary embodiments without departing from the scope and spirit of the invention.

What is claimed is:

1. A reusable, deconnable container for a self-reading pocket dosimeter comprising:
   a transparent tube adapted to receive the self-reading pocket dosimeter;
   a light source mounted at one end of said transparent tube; and
   an eyepiece mounted on an end opposite said one end containing said light source for viewing a read-out of the self-reading pocket dosimeter.

2. The container as recited in claim 1, further comprising an activation means for selectively supplying power to said light source.

3. The container as recited in claim 2, wherein said activation means comprises a battery, a contact switch located behind, but not in contact with, said battery, a lead connected to said light source and said contact switch, and a flexible cap located behind said battery and said contact switch for pressing said contact switch into contact with said battery when said flexible cap is depressed.

4. The container as recited in claim 2, wherein said activation means comprises a battery located behind said light sourced a stationary cap closing off said one end, and a pressure sensitive switch located between the battery and the stationary cap for connecting said battery to said light source when pressure is received by said stationary cap.

5. The container as recited in claim 1, wherein said light source is a light emitting diode.

6. The container as recited in claim 1, wherein said light source is a light bulb.

7. The container as recited in claim 1, further comprising a slidable cap closing off said end opposite said one end and wherein said eyepiece is housed in an opening of said slidable cap.

8. The container as recited in claim 1, wherein said eyepiece is integral with a transparent cap mounted on said end opposite said one end and closing off the container.

9. A complete dosimetry assembly comprising:
   a reusable, deconnable container enclosing a self-reading pocket dosimeter,
   wherein said container comprises a transparent tube adapted to receive said dosimeter, a light source mounted at one end of said transparent tube and an eyepiece mounted on an end of said tube opposite said one end for viewing a read-out of the dosimeter.

10. The assembly as recited in claim 9, further comprising an activation means for selectively supplying power to said light source.

11. The assembly as recited in claim 10, wherein said activation means comprises a battery, a contact switch located behind, but not in contact with, said battery, a lead connected to said light source and said contact switch, and a flexible cap located behind said battery and said contact switch for pressing said contact switch into contact with said battery when said flexible cap is depressed.

12. The assembly as recited in claim 10, wherein said activation means comprises a battery located behind said light source, a stationary cap closing off said one end, and a pressure sensitive switch located between the battery and the stationary cap for connecting said battery to said light source when pressure is received by said stationary cap.

13. The assembly as recited in claim 9, wherein said light source comprises a light emitting diode.

14. The assembly as recited in claim 9, wherein said light source comprises a light bulb.

15. The assembly as recited in claim 9, further comprising a slidable cap closing off said end opposite said one end and wherein said eyepiece is housed in an opening of said slidable cap.

16. The assembly as recited in claim 9, wherein said eyepiece is integral with a transparent cap mounted on said end opposite said one end and closing off the container.

* * * * *